(12) United States Patent
Christel et al.

(10) Patent No.: US 12,570,806 B2
(45) Date of Patent: Mar. 10, 2026

(54) PROCESS AND APPARATUS FOR DIRECT CRYSTALLIZATION OF POLYCONDESATES

(71) Applicant: POLYMETRIX AG, Oberbüren (CH)

(72) Inventors: Andreas Christel, Zuzwil (CH); Martin Müller, Uzwil (CH)

(73) Assignee: POLYMETRIX AG, Oberburen (CH)

( * ) Notice: Subject to any disclaimer, the term of this patent is extended or adjusted under 35 U.S.C. 154(b) by 512 days.

(21) Appl. No.: 16/663,508

(22) Filed: Oct. 25, 2019

(65) Prior Publication Data

US 2020/0148838 A1 May 14, 2020

(30) Foreign Application Priority Data

Nov. 8, 2018 (EP) .................................... 18205205

(51) Int. Cl.

| | |
|---|---|
| *C08J 3/12* | (2006.01) |
| *B01J 2/20* | (2006.01) |
| *B01J 8/00* | (2006.01) |
| *B29C 71/00* | (2006.01) |
| *C08J 7/02* | (2006.01) |
| *B29C 35/16* | (2006.01) |

(52) U.S. Cl.

CPC . *C08J 3/12* (2013.01); *B01J 2/20* (2013.01); *B01J 8/005* (2013.01); *B29C 71/0009* (2013.01); *B29C 71/0063* (2013.01); *C08J 7/02* (2013.01); *B29C 2035/1616* (2013.01)

(58) Field of Classification Search

CPC ......................................................... C08J 3/12
See application file for complete search history.

(56) References Cited

U.S. PATENT DOCUMENTS

| | | | |
|---|---|---|---|
| 3,544,525 | A | 12/1970 | Balint et al. |
| 4,197,660 | A | 4/1980 | Breitschaft et al. |
| 6,374,510 | B1 | 4/2002 | Geissbuehler et al. |

| | | | |
|---|---|---|---|
| 7,084,235 | B2 | 8/2006 | Otto et al. |
| 8,304,518 | B2 | 11/2012 | Bruckmann |
| 8,562,882 | B2 | 10/2013 | Eusebio et al. |
| 9,346,191 | B2 | 5/2016 | Hanimann et al. |
| 9,943,817 | B2 | 4/2018 | Christel et al. |
| 2006/0047103 | A1 | 3/2006 | Armentrout et al. |
| 2011/0124776 | A1* | 5/2011 | Grolman ................. F26B 21/14 524/1 |

FOREIGN PATENT DOCUMENTS

| | | | | |
|---|---|---|---|---|
| DE | 4300913 | A1 * | 7/1994 | .......... F26B 17/1416 |
| DE | 10 2004 015 515 | A1 | 9/2004 | |
| DE | 103 49 016 | A1 | 6/2005 | |
| DE | 10 2007 040 135 | A1 | 2/2009 | |
| EP | 2 712 881 | A1 | 4/2014 | |
| EP | 3363841 | A1 * | 8/2018 | ............... B29B 9/16 |
| WO | 99/18404 | A1 | 4/1999 | |
| WO | 2006/128408 | A1 | 12/2006 | |
| WO | 2008/071023 | A1 | 6/2008 | |

OTHER PUBLICATIONS

Chen, Continuous production of polyester-poly(ethylene terephthalate) resins in melt-phase and solid-state reactors, Polymer Engineering and Science, vol. 57 Issue 5, May 2017, p. 1-33 (Year: 2017).*
Schiers/Long (eds.), "Modern Polyesters", Wiley 2003, Chapter 4, pp. 143 ff and 158-164 See Spec., p. 1.

\* cited by examiner

*Primary Examiner* — Tabatha L Penny

(74) *Attorney, Agent, or Firm* — Finch & Maloney PLLC

(57) ABSTRACT

A process for continuous production of partly crystalline polycondensate pellet material which comprises the step of crystallizing the pellet material in a second treatment space ($6a$) under fixed bed conditions by supply of energy from the exterior by means of a process gas, wherein the process gas has a temperature ($T_{Gas}$), which is higher than the sum of the pellet temperature ($T_{GR}$) and the temperature increase ($T_{KR}$) which occurs due to heat of crystallization released hi the second treatment space ($6a$), i.e., ($T_{Gas} > (T_{GR} + T_{KR})$). The pellets at the exit from the second treatment space ($6a$) have an average temperature ($T_{PH}$), which is 10 to 90° C. higher than the sum of the temperature of the pellets ($T_{GR}$) and the temperature increase ($T_{KR}$) which occurs due to heat of crystallization released in the second treatment space ($6a$), i.e., ($T_{GR} + T_{KR} + 90° C.) \geq T_{PH} \geq (T_{GR} + T_{KR} + 10°$).

16 Claims, 2 Drawing Sheets

PROCESS AND APPARATUS FOR DIRECT CRYSTALLIZATION OF POLYCONDESATES

Figure 1:
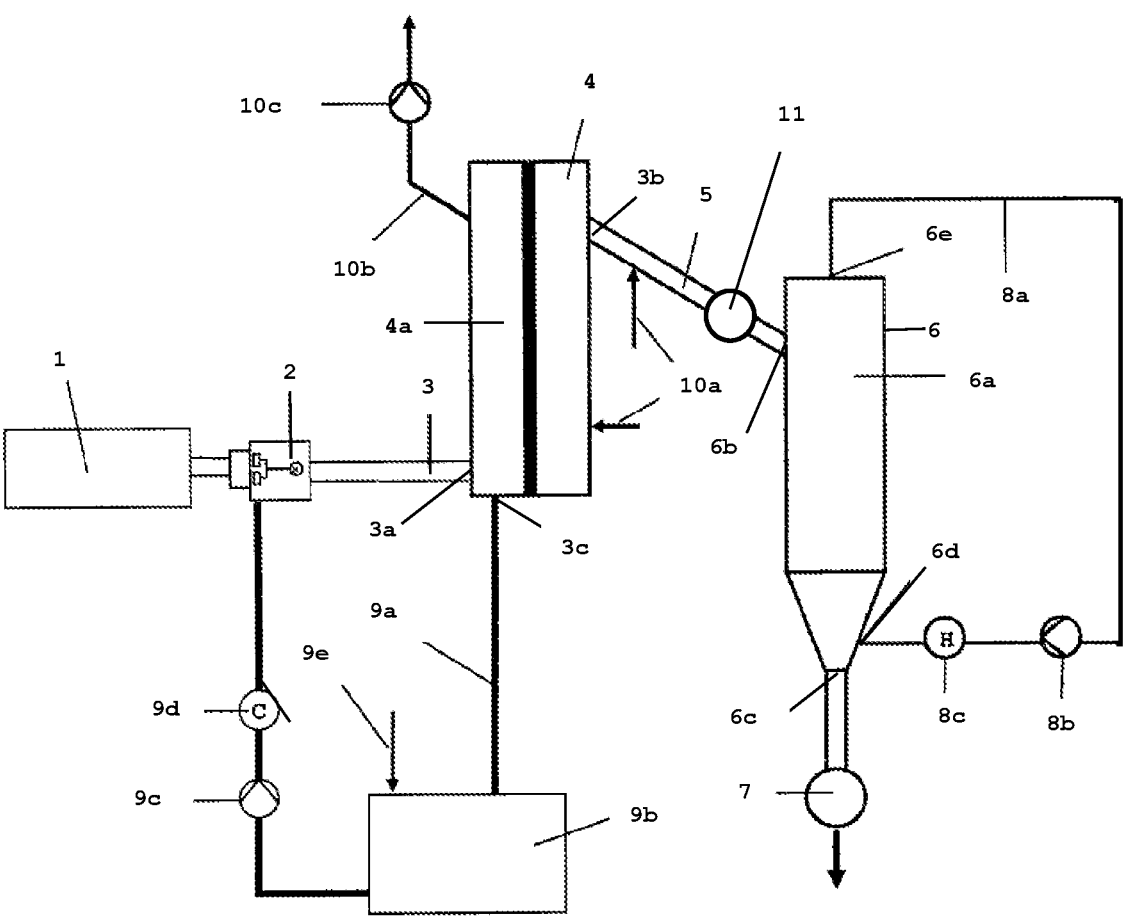

The present invention relates to a process and apparatus for direct crystallization of polycondensates, especially polyesters such as polyethylene terephthalate (PET).

The production of certain high molecular weight polymers, especially polycondensates such as polyesters, is frequently not possible via melt polycondensation, since the excessive thermal stress associated therewith is responsible for product degradation and an unacceptable contamination with by-products. Therefore, prepolymers having a comparatively low molecular weight are produced via melt polycondensation. The prepolymers are subsequently raised to the desired molecular weight in a solid-state polymerization (SSP). This procedure is known from the prior art (e.g., Scheirs/Long (eds.), Modern Polyesters, Wiley 2003, chapter 4, pp. 143 ff.).

The prepolymer obtained by melt polycondensation is processed into a pellet material for the SSP reaction. To avoid agglomeration of the pellets under the conditions of the SSP reaction due to stickiness, the pellet material is partly crystallized prior to the SSP reaction. This is also known from the prior art (e.g., Scheirs/Long (eds.), Modern Polyesters, Wiley 2003, chapter 4, pp. 158-164).

If the high-molecular polycondensate can be manufactured by melt polymerization, a subsequent partial crystallization may still be necessary, in order to enable further processing steps, such as devolatilization.

Usually, the polycondensate or polycondensate-prepolymer is cooled down after it has been formed into pellets and reheated for the crystallization. However, processes are also known from the prior art wherein the as-formed pellet material is fed in the hot state to the crystallization stage without cooling down in-between. Processes of this type are known as direct-crystallization processes. DE 103 49 016 and DE 10 2004 015 515, for example, describe so-called latent heat crystallization processes wherein crystallization is effected using solely the intrinsic heat of the pellets.

WO 2006/128408 describes a process for the partial crystallization of polyester pellets in which the pellets are partially crystallized (after preparation by underwater granulation and drying) at a pellet temperature of greater than 100° C. without the supply of external energy or heat by means of the intrinsic heat present in the pellets in a crystallization reactor oriented at least slightly inclined.

DE 10 2007 040 135 A1 describes a process for the production of polyester granules under conditions which keep a subsequent hydrolysis of the polyester as low as possible. It is described that under these conditions, an initial crystallization of <10% occurs without the supply of external energy or heat, which should prevent agglomeration of the polyester granulate and thus make further crystallization to avoid agglomeration superfluous, e.g. on a vibrating groove.

But these processes have the disadvantage that they are unable to meet the required flexibly adjustable and homogeneous quality of the output with regard to temperature and crystallinity. The frequent formation of agglomerates in the upstream-end region of the crystallization zone is a further disadvantage because they do not always break up again completely.

Better results are obtainable when the crystallization of the still hot pellets is effected by additional heating with a hot process gas. This is generally suggested, for example, in U.S. Pat. No. 3,544,525, but that document does not disclose process details. As discussed below, said method is associated with several drawbacks.

WO 2008/071023 describes a process wherein still hot pellet material is separated from the cooling medium in a pellet dryer and subsequently transferred into a crystallizer where it is treated under defined conditions. Both the pellet dryer and the crystallizer are operated here under an air atmosphere. Evaporated cooling medium can be removed by means of air. The flow velocity of the process gas in the crystallizer has to be above the loosening point of the polycondensate, and the polycondensate pellets have to exhibit a narrow spectrum of residence time in the crystallizer, in order to obtain homogeneously crystallized polycondensate pellets. In order to obtain a narrow spectrum of residence time, at least in parts of the crystallizer a strong turbulence has to be prevented. These specific process conditions are limiting and thus disadvantageous.

However, crystallization is not always possible under an air atmosphere, since oxidative degradation can occur at the high temperatures of crystallization. With certain materials/quality requirements, therefore, it is necessary to crystallize under an inert gas atmosphere.

U.S. Pat. No. 3,544,525 mentioned above describes a process wherein polymer melt is formed into a prepolymer pellet material via an underwater pelletization. The pellet material is subsequently dried in a dewatering unit (pellet dryer) and transferred into a crystallization device where it is crystallized with hot inert gas.

This process has various disadvantages. In addition to crystallization control and homogeneity being unsatisfactory, the design of the pellet dryer as a closed system causes an overpressure to develop therein due to the evaporating cooling liquid (water). As a consequence, the water is forced out of the pellet dryer and into the crystallizer and carried into the adjoining SSP reactor. Although the prepolymer is described as relatively dry in U.S. Pat. No. 3,544,525 after passing through the pellet dryer, the SSP reactor nonetheless has a high moisture content which is absorbed by the process gas flowing through the SSP reactor. Before returning into the SSP reactor, the process gas has to be freed of water in additional units (a condenser and a dryer), which is inconvenient. Alternatively, the moist process gas can be disposed of and replaced with fresh dry process gas. This variant is costly and hence unsatisfactory. In addition, the high moisture content of the SSP reactor causes the pellets to cool down, since the water adheres to the pellets and has to be condensed off. More process gas is accordingly needed in the SSP reactor in order to achieve the desired reaction temperature, and this is economically disadvantageous.

EP-3 363 841 A1 describes a process for the continuous production of a partially crystalline polycondensate granulate in which the crystallization of a polycondensate granulate produced by underwater granulation takes place after cooling to an average granulate temperature within the crystallization temperature range of the polycondensate in a crystallizer under fluidized bed conditions by means of a specific external energy supply. Since fluidized bed conditions can only be achieved with a high expenditure of equipment and energy, the useful range of application of this process is limited for economic reasons.

The problem to be solved by the present invention was to provide a process and apparatus for direct crystallization of polycondensate which do not have the disadvantages of the prior art, and which as compared to the prior art results in a simplification of the process design and the necessary equipment.

It was found according to the present invention that, surprisingly, the disadvantages of the prior art can be overcome when crystallization is conducted under fixed bed conditions with specific supply of energy from the exterior. As a result, a separate crystallizer can be surprisingly dispensed with. Instead, crystallization can be carried out in a fixed bed unit, such as a preheater, which is usually already present in SSP plants. This eliminates the need for a separate crystallization step and a unit required for this, with the corresponding economic advantages of simpler and faster process design and equipment simplification.

The present invention relates to a process for continuous production of partly crystalline polycondensate pellet material, comprising the steps of a) forming a polycondensate melt into pellet material by adding a liquid cooling medium, and cooling to an average pellet temperature within the range of temperature of crystallization of the polycondensate, wherein cooling takes place before or during or after forming to pellets;

b) separating the liquid cooling medium from the pellet material in a first treatment space, wherein the pellets after exit from the first treatment space exhibit a temperature $T_{GR}$, c) crystallizing the pellet material in a second treatment space, wherein in the second treatment space fixed bed conditions exist, and in the second treatment space the pellets are heated by supply of energy from the exterior by means of a process gas, wherein the process gas has a temperature $T_{Gas}$, which is higher than the sum of the pellet temperature $T_{GR}$ and the temperature increase $T_{KR}$ which occurs due to heat of crystallization released in the second treatment space, i.e. $T_{Gas} > (T_{GR} + T_{KR})$, and wherein the pellets at the exit from the second treatment space have an average temperature $T_{PH}$, which is 10 to 90° C. higher than the sum of the temperature of the pellets $T_{GR}$ and the temperature increase $T_{KR}$ which occurs due to heat of crystallization released in the second treatment space, i.e. $(T_{GR} + T_{KR} + 90° C.)$ $(T_{GR} + T_{KR} + 10° C.)$.

Partially crystalline polycondensate pellets are polycondensate pellets that have both amorphous zones and zones with a crystalline structure.

The present invention furthermore relates to a device for performing the above described method, comprising a unit for forming pellets with a line for supply of a cooling medium and a line for discharge of a mixture of pellets/cooling medium, a separating device arranged downstream of the unit for forming pellets and providing a first treatment space, and a unit which is arranged downstream of the separating device without a crystallization unit disposed there between and which provides a second treatment space and is equipped with an inlet opening and an outlet opening for the pellets, respectively, characterized in that the second treatment space is connected to at least two feed devices and at least two discharge devices for process gas, so that in the second treatment space the gas can be led through the pellets under conditions of a fixed bed.

According to the invention, the term "without a crystallization unit there between" is to be understood as meaning that between the separating device and the unit arranged downstream thereof there is no unit provided in which an increase in the degree of crystallization of the polycondensate granules of at least 5% is deliberately effected. Units with other purposes and in which only a slight increase of the degree of crystallization by a maximum of 5% is unintentionally effected due to the conditions prevailing therein, such as a classifying sieve or a tubular connecting line, are not crystallization units.

The present invention is provided for treating crystallizable polycondensates. Suitable polycondensates include crystallizable thermoplastic polycondensates, for example polyamides, polycarbonates, and polyesters including polyhydroxy alkanoates, polylactides or their copolymers, which are obtained via a polycondensation reaction by eliminating a low molecular weight reaction product. The polycondensation in question can take place directly between the monomers or via an intermediate stage which is subsequently converted by transesterification, in which case the transesterification can in turn take place by eliminating a low molecular weight reaction product or via ring-opening polymerization. Essentially, the polycondensate thus obtained is linear, wherein a low number of branching can be generated.

Polycondensates of a certain type of polymer are each made from the same main monomers. A limited amount of further monomers, so-called co-monomers, can be used therein.

Polyamides are polymers usually obtained via polycondensation from a diamine component with the general structure $H_2N$—R1-$NH_2$ and a dicarboxylic acid component with the general structure HOOC—R2-COOH, wherein R1 and R2 typically are optionally substituted, linear or branched aliphatic hydrocarbons with 1 to 15 carbon atoms, aromatic or heteroaromatic hydrocarbons with 1 to 3 aromatic rings, cyclic hydrocarbons with 4 to 10 carbon atoms or heterocyclic hydrocarbons with 1 to 3 oxygen or nitrogen atoms and 3 to 10 carbon atoms.

Instead of the dicarboxylic acid, also its corresponding dicarboxylic acid halogenide, preferably dicarboxylic acid chloride, can be used.

Examples of such polyamides are PA6,6, which is made from hexamethylene diamine and adipic acid, or PA-mXD6, which is made from m-xylylene diamine and adipic acid.

Polyamides are also polymers with repeating amide groups with the general structure H—[N(H)—R—CO]x—OH, wherein R typically is an optionally substituted, linear or branched aliphatic hydrocarbon with 1 to 15 carbon atoms, aromatic or heteroaromatic hydrocarbon with 1 to 3 aromatic rings, cyclic hydrocarbon with 4 to 10 carbon atoms or heterocyclic hydrocarbon with 1 to 3 oxygen or nitrogen atoms and 3 to 10 carbon atoms.

Polyamides are also polymers which are made by ring-opening polymerization from heterocyclic monomers with at least one amide group, such as for example polycaprolactame (PA6), which is manufactured from caprolactame.

Polyesters are polymers typically obtained via polycondensation from a diol component with the general structure HO—R1-OH and a dicarboxylic acid component with the general structure HOOC—R2-COOH, wherein R1 and R2 typically are optionally substituted, linear or branched aliphatic hydrocarbons with 1 to 15 carbon atoms, aromatic or heteroaromatic hydrocarbons with 1 to 3 aromatic rings, cyclic hydrocarbons with 4 to 10 carbon atoms or heterocyclic hydrocarbons with 1 to 3 oxygen or nitrogen atoms and 3 to 10 carbon atoms.

Usually linear or cyclic diol components and aromatic or heterocyclic dicarboxylic acid components are used. The ester, usually the dimethyl ester of the dicarboxylic acid can also be used instead of the dicarboxylic acid itself.

Typical examples of polyesters are polyethylene terephthalate (PET), polybutylene terephthalate (PBT), polytrimethylene terephthalate (PTT), polyethylene furanoate (PEF), polytrimethylene furanoate (PTF), polybutylene succinate (PBS) and polyethylene naphthalate (PEN), which are each used either as homopolymer or as copolymers.

An example is polyethylene terephthalate, which is obtained from its monomers, a diol component and a dicarboxylic acid component, the main diol component being ethylene glycol (1,2-ethanediol) and the main dicarboxylic acid component being terephthalic acid. Possible comonomers include further linear, cyclic or aromatic diol and dicarboxylic acid component compounds. Typical comonomers are diethylene glycol (DEG), isophthalic acid (IPA) or 1,4-bishydroxymethylcyclohexane (CHDM).

A further example is polyethylene furanoate, which is obtained from its monomers, a diol component and a dicarboxylic acid component, the main diol component being ethylene glycol (1,2-ethanediol) and the main dicarboxylic acid component being 2,5-furane dicarboxylic acid. Possible comonomers include further linear, cyclic or aromatic diol and dicarboxylic acid component compounds. Typical comonomers are diethylene glycol (DEG) or trimethylene glycol.

Polyesters are also polymers with repeating ester groups with the general structure H—[O—R—C]$_x$—OH, wherein R typically is an optionally substituted, linear or branched aliphatic hydrocarbon with 1 to 15 carbon atoms, aromatic or heteroaromatic hydrocarbon with 1 to 3 aromatic rings, cyclic hydrocarbon with 4 to 10 carbon atoms or heterocyclic hydrocarbon with 1 to 3 oxygen or nitrogen atoms and 3 to 10 carbon atoms.

An example are polyhydroxy alkanoates with the general structure H—[O—C(R)H—(CH$_2$)$_n$—CO]$_x$—OH, wherein R is usually hydrogen, or a linear or branched aliphatic hydrocarbon with 1 to 15 carbon atoms and n =1 to 10. Examples are poly-4-hydroxybutyrate and poly-3-hydroxyvalerate.

A further example are polylactides with the general structure H—[O—C(R)H—CO]$_x$—OH, wherein R is typically a methyl group or an aliphatic hydrocarbon with 1 to 15 carbon atoms.

A further example is the polyglycolic acid with the general structure H—[O—CH$_2$—CO]$_x$—OH].

Polyesters are also polymers which can be made by ring opening polymerization from heterocyclic monomers with an ester group, such as for example polycaprolactone from caprolactone, or by ring opening polymerization from heterocyclic monomers with at least two ester groups, such as polylactide from lactide.

The most common polylactide is polylactic acid with the structure H—[O—C(CH$_3$)H—CO]$_x$—OH. Due to the chirality of the lactic acid, there exist different forms of polylactic acid. Homopolymers are poly-L-Lactide (PLLA), which is usually made from L,L-lactide, and Poly-D-lactide (PDLA), which is usually made from D,D-lactide.

Copolymers such as poly-(L-lactide-co-D,L-lactide) contain little amounts of lactide units with chirality that it different from that of the main monomer.

Polyesters can also be manufactured by biosynthesis using microorganisms, or in plant cells, where they are obtained by destruction of the cell.

Suitable polycondensates can be crystallizable homopolymers. Despite the designation as homopolymer, during the manufacturing process thereof a small amount of comonomers may be formed. Thus, during manufacture of polyethylene terephthalate, it is known that diethylene glycol is formed from ethylene glycol. However, many suitable polycondensates are crystallizable copolymers which contain a certain amount of comonomer. The comonomers can be introduced into the manufacturing process of the polycondensate as portion of the monomers, or they are formed as part of the manufacturing process, typically resulting in an arbitrary distribution. The comonomers may also be introduced in the form of blocks, manufactured from different monomers, resulting in so-called block copolymers.

Typical amounts of one or more comonomers are from 1% to about 30% w/w. Due to the fact that in many cases an excessive amount of comonomer completely prevents crystallization, the maximum amount of comonomer may be limited to below 20% w/w, preferably below 10% w/w.

Suitable polycondensates may be mixtures of polymers which may contain an arbitrary number and amount of different types of polymers. A small amount of a polymer may act as nucleating agent in a polycondensate and thus increase its rate of crystallization. Specific mixtures of polycondensates can form mutually interacting crystal structures with crystallization characteristics which differ from that of the individual components.

A respective example is a mixture of PDLA and PLLA, which forms a stereocomplex crystal structure with increased crystallinity.

After polymerization, each polycondensate chain has chain-terminating groups with typically a functionality of at least one of its monomers. As an example, a polyester chain may have one or more hydroxyl and/or carboxyl end groups. A polyamide chain may have one or more hydroxyl and/or amino end groups. Such terminal groups may be modified by a so-called end-capping reagent, or they can be modified due to a degradation reaction. Although this was not specifically mentioned with respect to the above general structures, suitable polymers may have such modified terminal groups.

The polycondensate can be virgin material or a recyclate. Recyclates are reprocessed polymers from the production and processing operations (postindustrial) or polymers collected and reprocessed after having been used by consumers (post-consumer).

Additives may be incorporated in the polycondensate. Suitable additives include, for example, catalysts, dyes and pigments, UV blockers, processing aids, stabilizers, impact modifiers, blowing agents of the chemical and physical kinds, fillers, nucleating agents, flame retardants, plasticizers, particles to improve the barrier or mechanical properties, reinforcing articles, such as balls or fibers, and also reactive substances, for example oxygen absorbers, acetaldehyde absorbers or molecular weight enhancers.

The unit which is used in the present invention for forming a polycondensate pellet material is fed with a polycondensate melt as starting material. The polymer melt is produced using reactors or devices known in the prior art (e.g., Scheirs/Long (eds.), Modern Polyesters, Wiley 2003, especially pp. 31-104). In-principle possibilities include polymerization reactors in which the polycondensates are produced in the liquid phase, for example stirred tanks, cage reactors or disc reactors, or else equipment where previously produced polycondensates are melted, for example extruders or kneaders. Polycondensate melt production can be continuous or batchwise. However, continuous processes are preferable for further processing.

Individual strands of polycondensate are formed from the polycondensate melt in an exit apparatus, especially a die or dieplate. To produce pellets (i.e. particles of defined shape and size) from the strands of polycondensate, the pelletization techniques known in the prior art, such as strand pelletization, water-ring pelletization, underwater pelletization or hot face pelletization, can be used. In pelletization, the strands of polycondensate which exit from the melt channels are solidified and separated into a multiplicity of individual pellets before or after solidification. Separation is effected, for example, by autogenous dropletization, by the use of a liquid shearing medium or by mechanical severing, especially cutting. While dropletization, whether autogenous or forced by a shearing medium, takes place at the die exit, cutting can not only take place directly at the die exit, but also only after passage through a treatment sector.

The polycondensate melt is solidified by cooling with at least one liquid cooling medium or a mixture of different liquid cooling media. Especially suitable cooling media are liquids which have a high specific capacity of heat, preferably higher than 2 KJ/(kg·K), and a sufficiently high boiling point, preferably higher than 90° C., and which essentially do not attack or modify the polycondensate and do not leave behind any toxic residues in the polycondensate. According to a preferred embodiment of the invention, a single liquid cooling medium is used. Water or ethylene glycol or mixtures thereof are preferred. An especially preferred cooling medium is water.

The polycondensate, especially in the form of polycondensate strands or in the form of droplets, can, for example before entry into the liquid cooling medium, flow through a sector which contains a process gas, especially air or water mist. Notwithstanding the use of the term "water" in the designation of pelletizing means, other liquid media can also be used. Cooling can take place according to the present invention before, during or after the forming of the material into pellets.

Typically, the liquid cooling medium when entering the unit for forming the pellets has a temperature which is more than 50° C., but lies at least 10° C. below its boiling point. in the case of water, the temperature of the cooling medium at normal pressure is thus 50° C. to 90° C. Due to dependency of the boiling point on pressure, with increasing pressure in the liquid system the suitable temperature of the liquid cooling medium increases. With lower pressure the suitable temperature of the liquid cooling medium decreases, which inter alia also applies to open systems with low external pressure.

Preferably, the liquid cooling medium, preferably water, depending on the Tg of the polycondensate to be shaped correspondingly has a temperature of less than 85° C., particularly preferred of between 50° C. and 80° C. and especially preferred of between 60° C. and 75° C.

According to a preferred embodiment of the invention, when entering the unit for forming the pellets the liquid cooling medium has a temperature which is below the glass transition temperature (also called glass transition point, abbreviated with Tg) of the polycondensate to be shaped. In the case of polyesters, the pellets begin to agglomerate above the glass transition temperature of the material, i.e. the particles stick together forming agglomerates. For example, the glass transition temperature of polyethylene terephthalate is about 75° C. to 82° C. (depending on the comonomer content and the kind of added comonomers).

The glass transition temperature of a polycondensate may be determined with a DSC (digital scanning calorimetry) measurement. DSC is a conventional method commonly known to a skilled person. Devices for performing DSC measurements are also commonly known and commercially available. For example, the device Mettler DSC81 may be mentioned. For measuring the glass transition temperature of a polycondensate, such as a polyester, for example 5-25 mf of a respective polymer sample can be heated in a conventional Mettler DSC81 measurement device with a rate of 10° C./min from 25° C. to 290° C. The sample is kept at 290° C. for 1 min, then rapidly cooled down to room temperature and heated for a second time with a rate of 10° C./min from 25° C. to 290° C. The glass transition temperature is determined from the second run. As Tg, the point of inflection of the respective peak in the DSC is taken.

The pellets obtained in this way shall preferably have a defined pellet shape, for example cylinder-shaped, sphere-shaped, droplet-shaped, sphere-like or a designed shape as proposed in EP 0 541 674, for example. Average pellet size shall be between 0.1 mm and 10 mm, preferably between 0.5 mm and 3.5 mm and especially preferred between 0.85 mm and 3 mm.

The average pellet size is the statistical mean value of the average pellet diameter, which is derived from the ratio of pellet height, pellet length and pellet width (which can be measured by known methods). The pellet size distribution should be kept within a narrow spectrum. According to a preferred embodiment, the standard deviation of the weights of 100 measured pellets is between 2 and 20%.

According to the present invention, the pellet material obtained is subjected to direct crystallization, i.e. the pellet material is not cooled down so severely (to room temperature, for example) that for a subsequent crystallization it would have to be heated with high energy requirements. According to the present invention, the pellet material is cooled down to an average pellet temperature which is within the crystallization temperature range of the polycondensate. This is achieved by choosing the temperature of the cooling medium as described above and by optionally choosing a correspondingly short residence time for the pellet material in the cooling medium. According to a preferred embodiment of the invention, separation of the cooling medium from the pellets takes place within 0.1 to 5 s, especially preferred within 0.3 to 3s after addition of the cooling medium. Concurrently with the cooling, the polycondensate pellets can be conveyed into a further processing stop.

The average pellet temperature here designates the mean value of the temperatures of the individual pellets, wherein each pellet has a mean temperature which is established after a balance of the temperature profile in the pellets without heat exchange with the exterior has been reached.

The suitable range of temperature for the crystallization becomes apparent on plotting the crystallization half time (t½) as a function of the temperature. Said range is upwardly and downwardly limited by the temperature at which the crystallization half time is approximately equal to 10 times the minimum crystallization half time (t½ min). Since very short crystallization half times (t½) are very difficult to determine, t½ min=1 minute is used as minimum value. In the case of polyethylene terephthalate, for example, the suitable crystallization temperature range is between 110 and 220° C.; in the case of polyethylene furanoate the suitable crystallization temperature range is between 110 and 190° C., and in the case of poly-L-lactide the suitable crystallization temperature range is between 80 and 140° C.

The crystallization half time (t) is determined by isothermal crystallization in the DSC (differential scanning calorimetry). The crystallization half time corresponds to the time which, at a given temperature, is needed to attain 50% of the attainable crystallinity. The minimum crystallization half time (t½ min) is the shortest crystallization half time which can be attained in the crystallization temperature range.

Preferably, in the case of polyethylene terephthalate (PET) as polymer for treatment, the pellet material is cooled down to a temperature in the range from 110 to 180° C., preferably from 115 to 160° C. and more preferably from 120° C. to 150° C.

After cooling, the cooling medium is separated from the pellets and thus dried. Optionally, the pellets are subjected to a further treatment (conditioning) in a liquid medium, for which directly the cooling medium or some other liquid can be used.

The separation of pellets from a liquid cooling medium is carried out in a first treatment space using separating apparatuses known in the prior art as drying apparatuses. They may be merely passive separating apparatuses, for example grids or grills, through which the cooling medium can pass but not the pellet material. Active separating apparatuses are usually used for at least part of the separation, wherein the separation is effected for example due to a gas through-flow, a centrifugal force an impact, evaporation or combinations thereof. Apparatuses of this type are known for example as suction apparatuses, impact dryers or centrifugal dryers. Separation can be assisted by feeding a gas flow into the separating device, wherein the gas flow optionally includes heated or dried gas, in particular air. A centrifugal dryer with air supply is preferred.

For the separation from the cooling medium, the pellet material is transferred from an above-described unit for forming the pellet material via a connection line into a unit for separating the cooling medium. The transfer of the pellet material into the drying unit is carried out at such a rate of speed that the pellet material does not cool down below its crystallization temperature range. The flow velocity of the pellet material in the connection line can be increased by importing air or some other suitable gas into the connection line.

To accelerate evaporation of the cooling medium, preferably a temperature in the range from 100 to 200° C., preferably from 110° C. to 160° C. and more preferably from 120 to 150° C. is applied to the first treatment space. The residence time of the pellet material in the first treatment space is preferably in the range from one tenth of a second up to 10 seconds.

According to a preferred embodiment of the invention, after exit from the first treatment space the pellets exhibit a temperature $T_{GR}$ in the range from 100-180° C., preferably 120° C. to 160° C.

The separation device of the present invention has at least one feed-in opening for supplying the pellet material into the unit. The feed-in opening can be for example an opening in the housing, or the outlet from a pipe leading into the housing. The separation device of the present invention further has at least one discharge opening for exporting the pellet material out of the unit. The discharge opening can be for example an opening in the housing or the inlet into a pipe leading out of the housing. Furthermore, the separation device of the invention comprises at least one discharge opening for removing the liquid cooling medium from the unit.

A gas phase is present in the first treatment space, which absorbs the evaporating cooling medium. The gas is preferably air. But other gases or gas mixtures having a lower oxygen content than air can also be used.

The separation device of the present invention preferably is not a closed unit. The separation device preferably has at least one exit opening for exporting gas, preferably air. Preferably, the exit opening of the separation device empties into a gas exportation line which accommodates a ventilator for air circulation through the separation device. Optionally, the exit opening is connected to a condenser for the recovery of liquid cooling medium from the exported gas.

The separation device may further have at least one entry opening for importing gas, preferably air. The entry opening in this case is disposed at the opposite end of the first treatment space from the exit opening in order that complete flow of gas through the first treatment space may be ensured. However, it is also possible for the entry opening for importing gas to be disposed in a subsequent unit or in a connection line to a subsequent unit, and not in the separation device itself.

In a preferred embodiment of the present invention, the gas passes to the entry opening via an aspirating filter. A ventilator for air circulation through the separation device can be disposed in the gas line leading to the entry opening. This ventilator can be provided in addition to or in place of the ventilator in the gas exportation line.

The line leading to the entry opening and the line leading away from the exit opening can communicate with each other to form a closed-loop circuit. In this embodiment, however, the gas first has to pass through a condenser before re-entry into the first treatment space in order that the evaporated cooling medium in the gas may be separated off.

The apparatus of the present invention preferably has a cooling-medium circuit. The cooling medium is fed from a stock reservoir vessel (tank), preferably via a circulating pump and optionally a heat exchanger (for selectively heating or cooling the cooling medium), into the forming unit (pelletization apparatus). The cooling medium separated off in the separation device or in an optional condenser can be led back into the stock reservoir vessel via a pipework line.

After separation of the polycondensate pellets from the liquid cooling medium, there follows a transfer into the subsequent unit, which comprises a second treatment space. This is preferably accomplished by means of a connection line which is disposed between the separation device and the subsequent unit and connects the discharge opening of the separation device to the inlet opening of the subsequent unit. The connection line is preferably configured such that the material to be treated can pass unimpeded from the pre-connected unit to the downstream unit.

Optionally, between separation device and subsequent unit a sieve is provided, through which individual pellets with specified size can protrude unobstructed, but which holds back pellet agglomerates and too large pellets. An optional shut-off unit, preferably a sluice unit such as a rotary valve, is arranged between the separation device and the downstream unit. Several separation devices can be connected with a downstream unit In order that, in the event of a disturbance of the crystallization process, inconvenient and costly disposal of material may be avoided, the connection line of the present invention can, as described in WO 2008/071278, communicate with an intermediate storage unit into which the material is passed by a controlling apparatus in the event of a disturbance and is stored therein under conditions (especially decrease of the pellet temperature below the pellet glass transition point) where agglomeration of the pellets does not occur. The corresponding content of WO 2008/071278 is hereby expressly incorporated herein by reference.

Alternatively, the separation device is connected to the downstream unit in such a way that the pellets can be transferred directly from the separation device to the downstream unit As the pellet material to be treated enters the subsequent unit, it is in general essentially amorphous, i.e. its crystallinity is less than 10%, preferably less than 5%. According to the present invention, pellet material made of polyethylene terephthalate (PET) preferably has an IV value of 0.4 to 0.8 dl/g, especially 0.5 to 0.67 dl/g, before entry into the crystallizer. The IV value indicates the intrinsic viscosity of a polymer and is a measure of its molecular weight. The IV value and its determination are known from the prior art. The intrinsic viscosity (IV) is determined, according to the present invention, according to the following method: For determining the solution viscosity, a mixture of phenol/dichlorobenzene (50:50 wt.-%) is used as solvent. The polyester sample is dissolved during 10 minutes at 130° C. with a concentration of 0.5% (0.5 g/dl). Measurement of the relative viscosity (R.V.) is carried out at 25° C. with an Ubbelohde viscosimeter (according to DIN norm no. 53728, part 3 dated January 1985). The relative viscosity is the quotient of the viscosity of the solution and the viscosity of the pure solvent, which is comparable to the ratio of the corresponding capillary flow velocities. According to the Huggins equation, the value of the intrinsic viscosity is calculated from the measured relative viscosity;

$$I.V. = \frac{\sqrt{1 + 4K_H(R.V.-1)} - 1}{2*c*K_H}$$

With the above conditions of measurement (polymer concentration c=0.5 g/dl and Huggins constant ($K_H$=0.35), the above equation becomes:

$$I.V. = \frac{\sqrt{1 + 1.4(R.V.-1)} - 1}{0.35} \ (dl/g)$$

The viscosity of the polyester can be indicated either as intrinsic viscosity (IV) or as average molecular weight (number average: Mn). For converting an IV value, measured in phenol/dichloromethane=1:1, into the average molecular weight, the equation $$IV = k \cdot Mn^a$$

is used, wherein k=$2.1 \cdot 10^{-4}$ and a=0.82.

This equation can be generally applied to published data, unless a different solvent mixture and the corresponding conversion factors are explicitly indicated.

According to a preferred embodiment of the present invention, the polycondensate pellets flow essentially downwardly through the second treatment space, while a process gas flows through the second treatment space in counter-current or alternatively in cross-current or in a combination of counter-current and cross-current.

The process gas can be, for example, air, steam or inert gases such as nitrogen, noble gases such as argon, or $CO_2$. The process gas can comprise a mixture of several process gases. The process gas may comprise additives, which either react with the polycondensate to be treated, have a swelling action on the polycondensate, or deposit passively on the polycondensate pellets to be treated. The oxygen content of the process gas shall be less than 0.1% by weight, preferably less than 0.05% by weight and particularly preferably less than 0.02% by weight.

In the subsequent unit according to the invention, the polycondensate pellets are present in the second treatment space in form of a fixed bed, which encompasses a fixed bed that is moved during continuous operation.

Although the unit with a second treatment space can in principle be any unit in which a pellet treatment is carried out under fixed bed conditions, the advantages according to the invention are realized in particular by using a corresponding unit for this purpose which is usually already present in an SSP plant.

According to the invention, the unit with a second treatment space is therefore preferably a preheater. Such units are well known and described for example in DE 43 00 913 A1 and WO 99/18404 A1.

In other words, the method according to the invention can be carried out with any unit in which the conditions according to the invention can be set. However, the full benefits of this invention are obtained by using a device according to the invention described and claimed in detail below.

According to the invention, the second treatment space is preferably arranged below the first treatment space.

The second treatment space is surrounded by a housing. The horizontal cross section of the treatment space can have any desired shape, but preferably is round or rectangular. The disposition of the treatment space is preferably essentially vertical, so that the pellet material can flow downwardly through the apparatus. It is important here to achieve a product flow which is uniform. The second treatment space is laterally limited by a casing. The casing wall can consist of cylindrical or conical segments or of a combination of conical and cylindrical segments, whereby the gas speed distribution can be influenced via the height of the apparatus. Narrowing in the ceiling region enables an increased gas speed, leading to local swirling which allows an improved product distribution to be obtained.

One particular embodiment of the present invention provides an at least approximately rotationally symmetrical housing casing, which results in fabrication advantages as well as advantages in respect of regularity of product flow.

In the interior of the second treatment space displacers can be provided through which no pellet material flows and which accordingly reduce the size of the second treatment space. Displacers of this type can be used for example for routing of process gas, for adjusting the free cross-sectional area or for improving pellet flow.

Inside the second treatment space, partition walls can be provided, which divide the second treatment space into two or more chambers. The chambers may be connected with each other by means of passage openings for the pellets.

Preferably, at least one feed opening empties into the ceiling region of the second treatment space and facilitates the insertion of the pellet material to be treated into the second treatment space. The feed opening can be for example an opening in the housing, or the exit from a pipe leading into the housing. The feed opening can be subdivided into several segments, which enables distribution of the pellets in the treatment space.

Preferably, at least one discharge opening empties into the lower part of the second treatment space, and the treated pellet material can be discharged there through from the treatment space. The discharge opening can be for example an opening in the housing or the entry into a pipe leading out of the housing. Usually, the pellet material is led to discharge opening through a conical region. The angle of the outflow cone with the horizontal is preferably 50-80° when the pellet material is not fluidized or oscillated in the discharge cone, and 15-60°, especially 30-50° when the pellet material is fluidized or oscillated in the discharge cone. Alternatively, the pellet material can also be led to the discharge opening via a mechanical discharge apparatus, for example a screw.

A blocking unit, preferably a wheel unit such as a cellular wheel lock, or a roll unit, is located underneath the discharge opening and is used to control the efflux of pellet material out of the treatment space. The control variable here can be, for example, the fill height of the pellet material in the treatment space or the weight of the pellets in the apparatus comprising the second treatment space.

At least two feed devices and at least two discharge devices for a process gas lead to the second treatment space of the device according to the invention. Each supply device has at least one inlet through which process gas flows into the second treatment space. Each discharge device has at least one outlet through which process gas flows out of the second treatment space The feed device for a process gas may comprise units with at least one inlet opening, for example open-base cones, roofs or series of roof structures, as well as lines or metal sheets with exit holes, or else slit metal sheets and sieves or grids, through which gas flows into the second treatment space. The discharge device for the process gas may comprise units with at least one exit opening, for example open-base cones, roofs or series of roof structures, as well as lines or metal sheets with exit holes, or else slit metal sheets and sieves or grids, through which gas flows out of the second treatment space.

The feed devices can be located independently of each other in the jacket or in the floor area of the treatment space. The discharge devices can be located independently of each other in the jacket or in the ceiling area of the treatment space.

A particular embodiment is that a discharge device for the process gas is integrated into the inlet opening of the polycondensate pellets.

In one particular embodiment, the second treatment space is downwardly limited, at least to some extent, by a gas-permeable barrier means, especially a perforated metal sheet with a multiplicity of entry openings through which process gas can flow in some places at least, but pellets cannot. To this end, the openings are smaller than the diameter of the pellets. The permeable area is preferably between 1% and 30%. Preferably, the openings are between 20 and 90%, especially between 30 and 80%, of the diameter of the pellets. The number, size and arrangement of the openings here can be uniform or non-uniform. The shut-off device is arranged conically or diagonally downwards, whereby the angles described for the outlet cone also apply here.

In front of the feed devices there can be a distribution space through which process gas is led to the feed devices. At least one feed opening for process gas empties into this distribution space. After the discharge devices there can be a collection space in which process gas from the discharge devices is collected. At least one discharge opening for process gas empties into this collection space. There can further be apparatuses for distributing the process gas, such as baffle plates, valves or flaps, or else separate channels for individual feed and discharge of process gas. Devices may be located in or below the discharge device which allow the passage of process gas but obstruct the passage of pellets. This can be done, for example, by means of a bent or deflected flow channel or with the aid of deflecting installations such as a zigzag separator.

A preferred embodiment of the present invention provides that in the second treatment space on one plane there is a multitude of roof-shaped or tubular feed devices into which process gas coming from a distribution space flows, and a plurality of roof-shaped or tubular discharge devices is located above this plane on a further plane, through which process gas flows into a collection space, wherein the process gas flows from the lower plane to the upper plane and in so doing flows in countercurrent through the bulk material which flows through the second treatment space from top to bottom.

The feed devices and the discharge devices are arranged in such a way that a direct gas flow from the distribution space to the collection space is avoided.

If roof-shaped feeding devices are used, they can be arranged in such a way that the tips of the roofs are essentially directed upwards, thus opposing the flow of the polymer pellets, and the gas can exit downwards. If roof or tubular feeding devices are used, they may be arranged in such a way that the tips of the roofs are directed substantially upwards, thus opposing the flow of the polymer pellets, and the gas may exit through upwardly directed inlet openings. For this purpose, the corresponding inlet openings must be smaller than the average granulate diameter. Hole size and area are the same as for the gas-permeable shut-off device, which can limit the second treatment space downwards.

If roof-shaped discharge devices are used, they are arranged in such a way that the tips of the roofs are essentially directed upwards, thus opposing the flow of the polymer pellets, and the gas can enter from below. In order to ensure that the polymer pellets flow as uniformly as possible past the roof-shaped devices, these should have a roof slope of 50° to 80° compared to the horizontal. Irrespective of the shape of the devices, horizontal surfaces or surfaces with a slope of less than 45° on which pellets can deposit should be avoided, with the maximum width of the permissible horizontal surfaces not exceeding 50% of the mean diameter of the pellets.

A further preferred embodiment of the present invention provides for a feed device to be located in a jacket surface in the second treatment space and a discharge device for process gas to be located in a further jacket surface in the second treatment space, wherein the two jacket surfaces are arranged substantially opposite one another and between them form a substantially rectangular flow channel for the polycondensate pellets to be treated.

In accordance with the apparatus of the present invention, it is provided that, in addition to at least one feed device and discharge device for process gas, at least one further feed device and discharge device for process gas opens into the second treatment space. The at least one further feed device and discharge device is to be arranged such that the polycondensate pellets are exposed to the gas flow from the at least one additional feed device after passing through a region of the second treatment space in which they have been exposed to a gas flow from the at least one feed device. In particular, the additional feed device and discharge device is arranged below the at least one feed device, whereby a multistage heat supply and a multistage gas velocity profile can be achieved.

The pellet material is heated in the second treatment space by supply of energy from the outside, with the aid of the hot process gas. In this respect, the process gas is led into the second treatment space at a temperature $T_{Gas}$ which is higher than the sum of the pellet temperature $T_{GR}$ and the temperature increase $T_{KR}$ which occurs due to heat of crystallization released in the second treatment space, i.e. $T_{Gas} > (T_{GR} + T_{KR})$. The gas temperature $T_{Gas}$ thus lies above the average pellet temperature which the polycondensate pellets would reach within the second treatment space without external heat supply, the resulting advantage being that the polycondensate pellets can be set to a constant and defined exit temperature. According to the present invention, it could be shown that for obtaining a homogeneously crystallized polycondensate the external heat supply has to be carried out under consideration of the temperature increase $T_{KR}$ which occurs due to heat of crystallization released in the second treatment space.

The temperature increase $T_{KR}$ caused by released heat of crystallization in the second treatment space can be calculated in a known way ($q=m \cdot c \cdot \Delta T$, where q is the heat of crystallization of the polycondensate, m is the mass and c is the specific heat capacity of the polycondensate and q and c can be taken from relevant manuals).

Due to the increase in crystallinity, heat of crystallization is released. Due to this heat of crystallization, there occurs a temperature increase $T_{KR}$ which results from the amount of released heat divided by the specific heat capacity and the mass of the polycondensate, as described above.

Generally, the temperature increased $T_{KR}$ in the second treatment space which results from the released heat of crystallization lies in a range from 5° C. to 40° C. In particular, in the case of polyethylene terephthalate (PET) $T_{KR}$ lies in a range from 10° C. to 30° C., whereby a standard value of 20° C. can be used for PET with a comonomer content of 3 to 7% w/w if no concrete measured values are available.

According to a preferred embodiment of the present invention, the ratio X of the mass flows of gas ($m_G$) and pellets ($m_P$) ($X=m_G/m_P$) in the second treatment space is adjusted so that $4°$ C.$\leq(T_{Gas}-T_{KR}-T_{GR})*X\leq400°$ C., preferably $15°$ C.$\leq(T_{Gas}-T_{KR}-T_{GR})*X\leq300°$ C., more preferably $15°$ C.$\leq(T_{Gas}-T_{KR}-T_{GR})*X\leq250°$ C., more preferably $90°$ C.$<(T_{Gas}-T_{KR}-T_{GR})*X\leq300°$ C., more preferably $90°$ C.$<(T_{Gas}-T_{KR}-T_{GR})*X\leq250°$ C. This results in a polycondensate with particularly advantageous properties with regard to homogeneous crystallization and further processing by means of SSP reaction.

According to a preferred embodiment of the invention, the gas inlet temperature $T_{Gas}$ and the ratio X of gas quantity to product quantity are selected such that the polycondensate pellets at the outlet from the second treatment space are heated to a temperature $T_{PH}$ which is 10 to 90° C. greater than the sum of the pellet temperature $T_{GR}$ and the temperature increase $T_{KR}$ occurring in the second treatment space as a result of released heat of crystallization, i.e. ($T_{GR}+T_{KR}+90°$ C.)$\geq T_{PH}$ ($T_{GR}+T_{KR}+10°$ C.), the heating being preferred to ($T_{GR}+T_{KR}+90°$ C.)$\geq T_{PH}\geq(T_{GR}+T_{KR}+15°$ C.) and particularly preferred to ($T_{GR}+T_{KR}+90°$ C.)$\geq T_{PH}\geq(T_{GR}+T_{KR}+20°$ C.).

According to a preferred embodiment of the invention, the treatment in the second treatment space can take place in several stages, preferably from 2 to 200 stages, particularly preferably from 2 to 100 stages, one stage each comprising a pair of feed devices and discharge devices. Several feed devices of one stage may originate from one distribution space. Several discharge devices of a stage may emanate from one collection space. Each stage is preferably carried out with a ratio X of the mass flows of gas ($m_G$) and pellets ($m_P$) ($X=m_G/m_P$) of less than 1, especially preferably less than 0.5.

According to a preferred embodiment of the present invention, pellet material is heated in the second treatment space to a temperature which is 20° C. or more below the melt temperature of the polycondensate. In the case of polyethylene terephthalate (PET), the pellets are preferably heated in the second treatment space to a temperature in the range from 170 to 240° C., particularly preferred to 180° C. to 225° C.

Optionally, a further preheater is connected downstream of the unit with the second treatment space. In this case, too, the pellets are heated to the temperature intended for a subsequent SSP reaction.

The residence time of the polycondensate in the second treatment space is from 10 to 5 hours, preferably above minutes and preferably below 3 hours, with a residence time of at least 5 crystallization half-lives. In the case of a rapidly crystallizing polymer such as polyethylene terephthalate (PET) with a comonomer content of less than 7% w/w, the residence time shall preferably be between 30 minutes and 3 hours. Slowly crystallizing polymers have to stay longer in the second treatment space until the desired increase of the degree of crystallization is reached.

Since heated process gases are expensive, the invention provides that the process gas used is preferably routed at least partly in a circuit system where a small amount of exchange gas can be added and removed. In this preferred embodiment, there is a closed-loop circuit of pipework lines between the discharge means and feed means for the process gas.

The circuit may contain further units, for example compression means (e.g. ventilators, blowers or compressors), heat exchangers (e.g. heaters), barrier apparatuses (e.g. a valve or cock) or cleaning means (e.g. filters, cyclones, scrubbers or catalytic combustion means). If the process gas is added to the second treatment space in several stages, then between the stages there can be present additional units selected from the group consisting of compressors such as a ventilator, heat exchangers such as a heater, separators such as filters, or barrier apparatuses.

According to a preferred embodiment of the present invention, the unit with the second treatment space communicates with an inert gas tank, preferably via a feed line. Through the feed line, inert gas can be fed from the inert gas tank into the circuit system of pipework lines or directly into the unit with the second treatment space. Preferably, a metering unit, for example a control valve, is disposed in this feed line and can be used to control the importation of inert gas.

According to a preferred embodiment of the present invention, the pressure p2 in the second treatment space is set to be above the pressure p1 in the first treatment space. This prevents cooling medium transitioning from the first treatment space in the dryer into the second treatment space. Owing to the higher pressure in the second treatment space, inert gas does transition from the second treatment space into the first treatment space.

On exit from the second treatment space the pellet material preferably has a degree of crystallinity which is greater than 35% of the degree of crystallinity which could be maximally obtained at the treatment temperature in the second treatment space. In particular, on exit from the second treatment space the pellet material preferably has a degree of crystallinity which is between 40% and 70% of the degree of crystallinity which could be maximally obtained at this crystallization temperature.

According to a preferred embodiment of the present invention, an annealing of the polycondensate pellets takes place simultaneously with crystallization, whereby a possible low melting peak is shifted to a temperature which is at least 10° above the treatment temperature in the third treatment space described below, and/or whereby a possible low melting peak is reduced to a value below 3 J/g.

The low melting peak can be determined by DSC (Digital Scanning calorimetry) measurement. For example, to measure the low melting peak of a polycondensate such as a polyester, 5-25 mg of a corresponding polymer sample can be heated at a rate of 10° C./min from room temperature to a temperature above the melting point of the polycondensate in a Mettler DSC821 instrument. The low melting peak is the peak of the endothermic melting peak preceding the actual melting peak. The low melting peak and the melting peak may be mixed if the low melting peak is on the flank of the melting peak. In this case, the low melting peak can be determined from the first derivative of the DSC curve, with the intermediate minimum on the flank being the low melting peak.

In the case of polyethylene terephthalate (PET), on exit from the second treatment space the pellet material has a degree of crystallinity between 20% and 50%, especially between 31% and 45% and the low melting peak lies in the range from 190-250° C., in particular in the range from 200-240° C.

According to the present invention, the polycondensate pellets obtained after the crystallization can be subjected to a further thermal treatment step, which is preferably selected from the group of a devolatilizing step, preferably a dealdehydization step, and a solid-state polymerization (SSP). This thermal treatment step is carried out in a third treatment space, which is preferably situated in a separate reactor.

Both the devolatilization, preferably dealdehydization, and the SSP reaction are known to a person skilled in the art and need not be further elucidated herein. According to the present invention, this thermal treatment is preferably carried out in a third treatment space in a gas phase of inert gas, and causes volatile components to evaporate from the polymer during the treatment and pass into the gas phase. Nitrogen is preferably used as the inert gas. According to the present invention, the oxygen content of the gas in the third treatment space shall be less than 0.1% by weight, preferably less than 0.05% by weight and more preferably less than 0.02% by weight in order to reduce/avoid oxidative damage to the polycondensate pellets.

Owing to the high temperature of the polymer entering the third treatment space, there is no need to feed very hot process gas into the third treatment space. Owing to released heat of crystallization, according to the invention a temperature increase of 2 to 15° C., preferably of 3 to 15° C. and more preferably of 5 to 15° C. is generally observed in the third treatment space in the case of polyethylene terephthalate (PET). According to the present invention, therefore, in certain cases process gas can be fed into the third treatment space which has a temperature below the temperature of the polycondensate pellets in the third treatment space. The present invention accordingly provides that a subsequent thermal treatment step can be carried out in an energy-efficient manner.

The flow of the process gas in the third treatment space is preferably in counter current to the stream of polymer particles. The same reactors can be used in the thermal treatment as are conventionally used for the thermal treatment of bulk material. A conventional shaft reactor may be mentioned as an example.

The crystallized polycondensate pellets are transferred out of the second treatment space into the third treatment space in a known manner. For example, the pellets can be pneumatically conveyed from the second treatment space into the third treatment space. Depending on the speed of conveyance, the polycondensate pellets can cool down by between 2 and 15° C., preferably between 3 and 15° C. and more preferably between 5 and 15° C. If necessary, the pellets can be additionally heated in a known manner before entry into the third treatment space.

According to the present invention, the dealdehydization of, for example, polyethylene terephthalate can take place at a temperature of 140 to 200° C. in the third treatment space. A temperature increase in the third treatment space of 3 to 15° C. is observed in the course of this dealdehydization, for example.

According to the present invention, the SSP reaction of, for example, polyethylene terephthalate can take place at a temperature of 180 to 240° C., preferably 180 to 225° C. in the third treatment space. A temperature increase in the third treatment space of 3 to 15° C. is observed in the course of this SSP reaction, for example.

The present invention will now be further be described in detail by reference to non-limiting drawings, where FIG. 1 shows a schematic illustration of a preferred embodiment of an apparatus according to the present invention.

Figure 2:
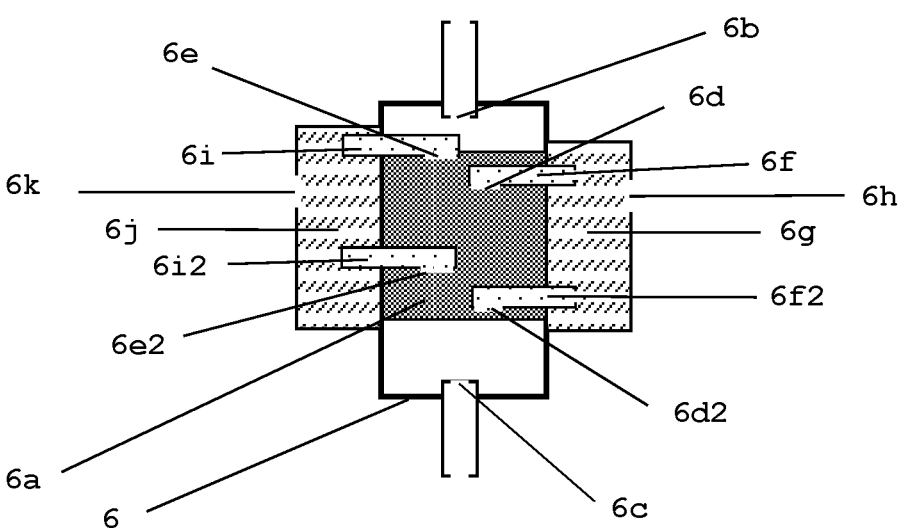

FIG. 2 shows a schematic illustration of a preferred embodiment of a downstream unit with a second treatment space in accordance with the present invention, wherein the process gas is conducted essentially in countercurrent flow.

The apparatus according to FIG. 1 has a reactor 1 for producing a polymer melt. This can be a reactor in which a melt polymerization is carried out to thus produce a prepolymer from the monomers. Alternatively, reactor 1 can also be an apparatus for melting a solid product, for example a prepolymer. Reactor 1 can in this case be an extruder, for example.

The molten material is transferred into a pelletization apparatus 2. In the pelletization apparatus 2, a pellet material is produced from the molten material in a known manner. This may be, for example, an underwater pelletizer (as shown in FIG. 1). Pelletization takes place under water in this case. The pellets obtained are concurrently cooled down in pelletizer 2. As noted above, however, cooling must not be so severe as to cool the pellets to below their crystallization temperature range. This can be achieved by the use of heated water having a temperature above 50° C., but at least 10° C. below it pressure-dependent boiling point, in particular having a temperature below the Tg of the polycondensate, especially having a temperature from 50 to 80° C. The pellet material should, in the case of polyethylene terephthalate (PET), be cooled to a temperature in the range from 110 to 180° C., preferably 115 to 160° C. and especially preferred 120 to 150° C.

The pellet material is transferred via a connection line 3 and through an inlet opening 3a into the unit for drying the pellet material (separating unit) 4. To prevent the pellet material from cooling down too much, this pellet material should be conveyed as quickly as possible out of the pelletization apparatus 2 and through the connection line 3. Preferably, the flow velocity in connection line 3 can be increased by feeding a gas stream (preferably air) into it.

The pellet material is separated from the liquid cooling medium (water) and dried in a first treatment space 4a in the unit for drying the pellet material (separating unit) 4. The cooling medium separated off is conducted through an exit opening 3c via a pipework line 9a back into the stock reservoir vessel (tank) 9b for the cooling medium. The stock reservoir vessel 9b has an inlet 9e for importation of cooling medium. From the stock reservoir vessel 9b, the cooling medium is transferred into the pelletization apparatus 2 by means of a circulation apparatus (pump) 9c. In the course of the transfer, the cooling medium preferably traverses a heat exchanger 9d. In the heat exchanger 9d, the cooling medium can be heated or cooled down, as required. Especially cooling medium returned from the separating unit 4 can have an excessive temperature because of the contact with hot pellet material and has to be cooled before entry into the pelletization apparatus 2.

The fresh cooling medium, which is added via the inlet 9e, can contain a basic medium or a pH buffer medium. In particular, the use of water with a neutralizing or buffer effect which is adjusted within a narrow range is provided herein. Alternatively, the addition of a basic medium or of a pH buffer medium can also be effected directly into the cooling circular system, e.g. into the storage container 9b.

The drying of the pellet material in the first treatment space of unit 4 is effected at a temperature of 100 to 200° C., preferably 120 to 160° C., by means of air, or a gas atmosphere comprising essentially air, besides a mechanical separation unit. In the apparatus of FIG. 1, the air is fed into the separating unit 4 via an inlet opening 10a. The inlet opening 10a for the gas can be situated in the housing of separating unit 4 or in the connection line 5 or in both locations. Optionally, an aspirating filter (not shown) can be disposed in the gas line leading to the inlet opening 10a. The air leaves the separating unit 4 through the outlet opening 10b. A ventilator 10c for circulating the air through the separating unit 4 is provided in the gas line 10c leading away from the exit opening 10b in the apparatus of FIG. 1. However, the ventilator could alternatively also be provided in the air inlet line 10a. Furthermore, inlet opening 10a and outlet opening 10b can be connected to each other to form a circuit system. A condenser would then have to be provided in this circuit system.

The pellets are transferred from the separating device 4 through a discharge opening 3b via a connecting line 5 via a cellular wheel lock 11 through an inlet opening 6b into a unit 6 with a second treatment space 6a. The pellets can pass unhindered from the separating device 4 into the unit 6. In this embodiment, unit 6 is a preheater.

In unit 6, the essentially amorphous pellet material is at least partially crystallized in a second treatment space 6a. Within the second treatment space 6a, the pellets are thermally treated by a gas stream passing through unit 6 in countercurrent or crosscurrent. Within the second treatment space 6a, the conditions are those of a fixed bed.

The pellets are crystallized by external heat supply, wherein for external heat supply a process gas in counter current to the pellet flow is led through the second treatment space 6a, said process gas having a temperature $T_{Gas}$ which is higher than the sum of the pellet temperature $T_{GR}$ and the temperature increase $T_{KR}$ in the second treatment space 6a which occurs due to released heat of crystallization, i.e. $T_{Gas} > (T_{GR} + T_{KR})$. In the case of polyethylene terephthalate (PET) crystallization occurs due to heating to a temperature of 170 to 235° C., wherein a process gas having a temperature $T_{Gas}$ of 175 bis 240° C. is used. At temperatures above 180° C. there is preferably used an inert gas, essentially nitrogen, as process gas. The crystallized pellet material exits the unit 6 through an exit opening 6c via a discharge apparatus 7, for example a barrier apparatus such as a cellular wheel lock.

Alternatively, downstream of the cellular wheel lock there can be provided a second wheel unit (such as a cellular wheel lock).

The pellets can be subjected to a subsequent thermal treatment such as a dealdehydization or SSP reaction. Alternatively, the pellets can also be sent into a cooling step.

The process gas used in unit 6 is conducted through a closed-loop circuit system of pipework lines 8a. The process gas enters into unit 6 through an inlet opening 6d and exits the opening 6 through an outlet opening 6e. The circuit system for the process gas contains a ventilator 8b for circulating the gas. A heat exchanger 8c is provided upstream of the inlet opening 6d to bring the gas to the desired temperature before entry into the unit 6. Preferably, the gas is heated in heat exchanger 8c.

FIG. 2 shows a schematic representation of a preferred embodiment of a downstream unit 6 in the form of a countercurrent preheater with a second treatment space 6a according to the present invention, as described for example in Scheirs/Long (ed.), Modern Polyesters, Wiley 2003, p. 170.

This preferred embodiment of a downstream unit 6 with a second treatment space 6a also has an inlet opening 6b and an outlet opening 6c for the polycondensate pellets, as described above for FIG. 1.

This particular embodiment is characterized by the fact that the inlet opening 6d is located in a feed device 6f. In front of the feed device 6f there is a distribution space 6g through which process gas is fed to the feed device 6f. Several feeding devices 6f with corresponding inlet openings 6d can be provided.

At least one feed opening 6h for process gas empties into this distribution space 6g.

This particular embodiment is further characterized by the fact that the outlet opening 6e is located in a discharge device 6i. There may be several discharge devices 6i with corresponding outlet openings 6e. Behind the discharge devices 6i there is a collection space 6j in which process gas from the discharge devices 6i is collected. At least one discharge opening 6k for process gas empties into this collection space 6j.

Furthermore, devices for the distribution of the process gas, such as baffles, valves or flaps, as well as separate channels for individual process gas supply and removal can be arranged. Devices can be located in or below the discharge device 6i which allow the passage of process gas but obstruct the passage of pellets. This can be done, for example, by means of a bent or deflected flow channel or with the aid of deflecting installations such as a zigzag separator.

Preferably a plurality of roof-shaped or tubular feed devices 6f, into which process gas coming from a distribution space 6g flows, are located on one plane, and above this plane on a further plane a plurality of roof-shaped or tubular discharge devices 6i, through which process gas flows into a collection space 6j, are located, wherein the process gas flows from the lower plane to the upper plane and in so doing flows through the bulk material, which flows through the second treatment space 6a from top to bottom, in countercurrent.

The feeding devices 6f and the discharge devices 61 are arranged in such a way that a direct gas flow from the distribution space 6g to the collection space 6j is avoided.

Furthermore, the preferred embodiment according to FIG. 2 is characterised in that below and in addition to at least one feed device 6f and discharge device 6i for process gas, at least one further feed device 6f2 and discharge device 6i2 for process gas opens into the second treatment space 6a. The inlet opening 6d2 is located in the feed device 6f2. The feed device 6f2 also opens into the distribution space 6g through which process gas is fed to the feed device 6f2.

The inlet opening 6e2 is located in the discharge device 6i2. The discharge device 6i2 also empties into the collection room 6j.

The at least one further feed device 6f2 and discharge device 6i2 are arranged such that the polycondensate pellets are exposed to the gas flow from the at least one additional feed device 6*f*2 after passing through a region of the second treatment space 6*a* in which it has been exposed to a gas flow from the at least one feed device 6*f*. This allows a multistage heat supply to be achieved.

FIG. 3 shows a schematic representation of another preferred embodiment of a downstream unit 6 with a second treatment space 6*a* in accordance with the present invention.

The second treatment space 6*a* is essentially a vertically aligned slot in a round, cylindrical jacket of the downstream unit 6.

This preferred embodiment of a downstream unit 6 with a second treatment space 6*a* also has an inlet opening 6*b* and an outlet opening 6*c* for the polycondensate pellets, as described above in FIGS. 1 and 2.

This preferred embodiment of a downstream unit 6 with a second treatment space 6*a* also features a feed device 6*f* and a discharge device 6*i* for the process gas.

The particular embodiment according to FIG. 3 is characterised by the fact that the inlet opening 6*d* is located in a feed device 6*f*. The feed device 6*f* is preferably equipped with a large number of inlet openings 6*d*, wherein the inlet openings 6*d* are selected in such a way that process gas, but not pellets, can flow through them. A preferred embodiment is that the feed device 6*f* comprises a perforated plate or a slotted screen in which the inlet openings 6*d* are arranged.

At least one 6*h* feed opening for process gas opens into the 6*f* feed device.

This particular embodiment is further characterised by the fact that the outlet opening 6*e* is located in a discharge device 6*i*. Preferably, the discharge device 6*i* is provided with a multitude of outlet openings 6*e*, wherein the outlet openings 6*e* are selected in such a way that process gas, but not pellets, can flow through them. A preferred embodiment is that the discharge device 6*i* comprises a perforated plate or a slotted screen in which the outlet openings 6*e* are arranged.

At least one discharge opening 6*k* for process gas flows into the discharge device 6*i*.

Furthermore, devices for the distribution of the process gas, such as baffles, valves or flaps, as well as separate channels for individual process gas supply and removal, can be provided.

The feed devices 6*f* and the discharge devices 6*i* are preferably located essentially on the same plane, wherein the process gas flows from the feed device 6*f* to the discharge device 6*i* and in so doing flows through the bulk material, which flows through the second treatment space 6*a* from top to bottom, in a cross-current.

Furthermore, the preferred embodiment according to FIG. 3 is characterised in that below and in addition to at least one feed device 6*f* and discharge device 6*i* for process gas, at least one further feed device 6*f*2 and discharge device 6*i*2 for process gas opens into the second treatment space 6*a*. The at least one further feed device 6*f*2 and discharge device 6*i*2 are arranged such that the polycondensate pellets are exposed to the gas flow from the at least one additional feed device 6*f*2 after passing through a region of the second treatment space 6*a* in which it has been exposed to a gas flow from the at least one feed device 6*f*. This allows a multi-stage heat supply to be achieved.

The present apparatus of the present invention is very useful for continuous pelletization and crystallization of a polymer, especially a polycondensate, preferably a polyester such as polyethylene terephthalate.

The relationship between gas temperature and gas to product ratio to product temperature can be illustrated by the following non-restrictive examples:

Example 1

In a round, cylindrical treatment space with a diameter of 1.9 m and a vertical distance of 1.2 m between the gas inlet and outlet, 10 t/h of PET pellets with an initial crystallinity of 2.5% and an inlet temperature of $T_{GR}=140°$ C. were treated.

When 3000 kg/h (X=0.3) of nitrogen with $T_{Gas}=220°$ C. were added in counter-current, heating to $T_{PH}=171°$ C. and an increase in crystallinity to 32.5% took place, which corresponds to a temperature increase due to crystallization $T_{KR}=18.7°$ C. For the heat of crystallization q=115 J/g is used for 100% crystallinity, and for the heat capacity c=1.84 J/g/K is used.

$T_{Gas}$ is therefore 61.3° C. higher than $T_{GR}+T_{KR}$, and $X*(T_{Gas}-T_{GR}-T_{KR})$ is 18.4° C., and $T_{PH}$ is 12.3° C. higher than $T_{GR}+T_{K}R$.

The gas velocity at the gas outlet was 0.36 m/s, which meant that fixed bed conditions were present. The result was a pressure drop of 34 mbar. The residence time of the pellets in the treatment space was 16.3 minutes.

Example 2

When the amount of gas in example 1 was increased to 6000 kg/h (X=0.6), heating to $T_{PH}=181.2°$ C. took place. The increase in crystallinity and thus $T_{KR}$ remain unchanged.

$T_{Gas}$ remains 61.3° C. higher than $T_{GR}+T_{KR}$, and $X*(T_{Gas}-T_{GR}-T_{KR})$ is 36.8° C., and $T_{PH}$ is 24.2° C. higher than $T_{GR}+T_{KR}$.

The gas velocity at the gas outlet was 0.73 m/s, which meant that fixed bed conditions were still present. There was a pressure drop of 66 mbar.

This example shows the better heating with a higher amount of gas in the fixed bed.

Comparative Example 1

When the amount of gas in example 1 was increased to 8000 kg/h (X=0.8), the gas velocity at the gas outlet was >1 m/s, resulting in local fluidized bed conditions. Only heating to $T_{PH}=178.8°$ C. took place.

The result was a pressure drop of 75 mbar.

This example shows the worse heating in spite of higher amount of gas, as well as the higher pressure drop, when the heating is no longer carried out under fixed bed conditions.

Example 3

When the treatment space in example 1 was divided into 4 zones of 0.3 m height and the product was treated in each zone with an amount of gas of 6000 kg/h (X total=2.4), heating to $T_{PH}=206°$ C. was carried out.

With $T_{KR}$ unchanged, $X*(T_{Gas}-T_{GR}-T_{KR})$ is 166° C., and $T_{PH}$ is 47.3° C. higher than $T_{GR}+T_{KR}$.

The average gas velocity at the gas outlet was 0.79 m/s, which meant that fixed bed conditions were still present. This resulted in a pressure drop of 71 mbar.

This example shows the better heating with a multi-stage process.

Comparative Example 2

When the second treatment space was provided in a simple crystallization vessel, at least an H/D ratio of 2 had to be maintained for sufficient product and gas distribution. With a residence time of 7.5 minutes and a throughput of 10 t/h, a crystallization vessel with a diameter of 1 m and a height of 2 m was to be used. The PET pellets with an initial crystallinity of 2.5% were treated with an inlet temperature of $T_{GR}=140°$ C.

When 1800 kg/h (X=0.18) of nitrogen with $T_{Gas}=220°$ C. were added in counter-current, heating to $T_{PH}=162°$ C. and an increase in crystallinity to 25.3% took place, which corresponds to a temperature increase due to crystallization $T_{KR}=14.2°$ C.

$T_{Gas}$ is therefore 65.8° C. higher than $T_{GR}+T_{KR}$, and $X*(T_{Gas}-T_{GR}-T_{KR})$ is 11.8° C., and $T_{PH}$ is 7.8° C. higher than $T_{GR}+T_{KR}$.

The gas velocity at the gas outlet was 0.78 m/s, which meant that fixed bed conditions were still present. However, there was a pressure drop of 112 mbar.

This example shows the poorer heating in a conventional crystallization vessel with a simultaneous high pressure drop. A significantly higher amount of gas cannot be used, as otherwise fixed bed conditions no longer exist.

Comparative Example 3

When comparative example 2 was carried out with a product throughput of 50 t/h, a crystallization vessel with a diameter of 1.75 m and a height of 3.5 m was to be used with a residence time of 8 minutes.

When 5500 kg/h (X=0.11) of nitrogen with $T_{Gas}=220°$ C. were added in counter-current, heating to $T_{PH}=159.4°$ C. and an increase in crystallinity to 25.9% took place, which corresponds to an increase in temperature due to crystallization $T_{KR}=14.6°$ C.

$T_{Gas}$ is therefore 65.4° C. higher than $T_{GR}+T_{KR}$, and $X*(T_{Gas}-T_{GR}-T_{KR})$ is 7.2° C., and $T_{PH}$ is 4.8° C. higher than $T_{GR}+T_{KR}$.

The gas velocity at the gas outlet was 0.77 m/s, which meant that fixed bed conditions were still present. However, there was a pressure drop of 188 mbar.

This example shows how the situation deteriorates with increasing throughput with a conventional crystallization vessel.

The invention claimed is:

1. A process for continuous production of partly crystalline polyethylene terephthalate homopolymer or copolymer pellet material, comprising the steps of:
   a) forming a melt of a polyethylene terephthalate homopolymer or copolymer into pellets by adding a liquid cooling medium, and cooling to an average pellet temperature within the range of temperature of crystallization of the polyethylene terephthalate homopolymer or copolymer, wherein cooling takes place before or during or after forming to pellets;
   b) separating the liquid cooling medium from the pellets in a first treatment space, wherein the pellets after exit from the first treatment space exhibit a pellet temperature $(T_{GR})$; and
   c) crystallizing the pellets in a second treatment space, wherein in the second treatment space fixed bed conditions exist and the pellets are heated in the second treatment space by supply of energy from the exterior by a process gas, wherein the process gas has a gas temperature $(T_{Gas})$, which is higher than a sum of a pellet temperature $(T_{GR})$ and a temperature increase $(T_{KR})$ which occurs due to heat of crystallization released in the second treatment space, (i.e., $T_{Gas}>(T_{GR}+T_{KR})$), and wherein the pellets at the exit from the second treatment space have an average temperature $(T_{PH})$, which is 10 to 90° C. higher than the sum of the temperature of the pellets $(T_{GR})$ and the temperature increase $(T_{KR})$ which occurs due to heat of crystallization released in the second treatment space (i.e., $(T_{GR}+T_{KR}+90°$ C.$)\geq T_{PH}\geq(T_{GR}+T_{KR}+10°$ C.$)$), and wherein a ratio X of a mass flows of gas $(m_G)$ and pellets $(m_P)$ $(X=m_G/m_P)$ in the second treatment space is set such that $4°$ C.$\leq(T_{Gas}-T_{KR}-T_{GR})*X\leq400°$ C.

2. The process according to claim 1, wherein drying of the pellets occurs in the first treatment space, and, after exit from the first treatment space, the pellets have a pellet temperature $(T_{GR})$ in the range from 100 to 180° C.

3. The process according to claim 1, wherein the liquid cooling medium has a temperature in the range of 50° C. to 80° C.

4. The process according to claim 1, wherein a process gas flows through the second treatment space in counter-current or alternatively in cross-current or a combination of counter-current and cross-current.

5. The process according to claim 1, wherein crystallizing the pellets in the second treatment space takes place in several stages, and each stage comprises feed devices and discharge devices, wherein all feed devices emanate from a distribution space and all discharge devices empty into an associated collection space.

6. The process according to claim 1, wherein in the second treatment space the pellets are heated to a temperature intended for a subsequent SSP reaction.

7. The process according to claim 1, wherein in step a) the liquid cooling medium has a temperature below the glass transition point (Tg) of the polyethylene terephthalate homopolymer or copolymer.

8. The process according to claim 1, wherein the pellets are heated at an outlet from the second treatment space to the average temperature $(T^{PH})$ ((i.e., $(T^{GR}+T^{KR}+90°$ C.$)\geq T^{PH}\geq(T^{GR}+T^{KR}+15°$ C.$)$).

9. A process for continuous production of partly crystalline polyethylene terephthalate homopolymer or copolymer pellet material, comprising the steps of:
   a) forming a melt of a polyethylene terephthalate homopolymer or copolymer into pellets by adding a liquid cooling medium, and cooling to an average pellet temperature within the range of temperature of crystallization of the polyethylene terephthalate homopolymer or copolymer, wherein cooling takes place before or during or after forming to pellets;
   b) separating the liquid cooling medium from the pellets in a first treatment space, wherein the pellets after exit from the first treatment space exhibit a pellet temperature $(T_{GR})$ and a crystallinity of less than 10%; and
   c) crystallizing the pellets in a second treatment space, wherein in the second treatment space fixed bed conditions exist and the pellets are heated in the second treatment space by supply of energy from the exterior by a process gas, wherein the process gas has a gas temperature $(T_{Gas})$, which is higher than a sum of a pellet temperature $(T_{GR})$ and a temperature increase $(T_{KR})$ which occurs due to heat of crystallization released in the second treatment space, (i.e., $T_{Gas}>(T_{GR}+T_{KR})$), and wherein the pellets at the exit from the second treatment space have an average temperature $(T_{PH})$, which is 10 to 90° C. higher than the sum of the temperature of the pellets $(T_{GR})$ and the temperature increase $(T_{KR})$ which occurs due to heat of crystallization released in the second treatment space (i.e., $(T_{GR}+T_{KR}+90°$ C.$)\geq T_{PH}\geq(T_{GR}+T_{KR}+10°$ C.$)$), and wherein a ratio X of a mass flows of gas $(m_G)$ and pellets $(m_P)$ $(X=m_G/m_P)$ in the second treatment space is set such that $4°$ C.$\leq(T_{Gas}-T_{KR}-T_{GR})*X\leq400°$ C., wherein crystallizing the pellets in the second treatment space takes place in two or more stages, each stage of the two or more stages comprising feed devices and discharge devices, and wherein each stage is carried out with a ratio X of mass flows of gas $(m_G)$ and pellets $(m_P)$ $(X=m_G/m_P)$ of less than 1.

10. The process according to claim 9, wherein drying of the pellets occurs in the first treatment space, and, after exit from the first treatment space, the pellets have a pellet temperature $(T_{GR})$ in the range from 100 to 180° C.

11. The process according to claim 10, wherein the liquid cooling medium has a temperature in the range of 50° C. to 80° C.

12. The process according to claim 11, wherein a process gas flows through the second treatment space in counter-current or alternatively in cross-current or a combination of counter-current and cross-current.

13. The process according to claim 9, wherein all the feed devices emanate from a distribution space and all the discharge devices empty into an associated collection space.

14. The process according to claim 13, wherein in the second treatment space the pellets are heated to a temperature intended for a subsequent SSP reaction.

15. The process according to claim 9, wherein in step a) the liquid cooling medium has a temperature below the glass transition point (Tg) of the polyethylene terephthalate homopolymer or copolymer.

16. The process according to claim 15, wherein the pellets are heated at an outlet from the second treatment space to the average temperature ($T^{PH}$) ((i.e., ($T^{GR}+T^{KR}+90°$ C.)$\geq T^{PH} \geq$ ($T^{GR}+T^{KR}+15°$ C.)).

\* \* \* \* \*